(12) United States Patent
Kim

(10) Patent No.: US 9,375,749 B2
(45) Date of Patent: Jun. 28, 2016

(54) HUB NUT CAULKING APPARATUS

(71) Applicant: TOSYS CO., LTD., Incheon (KR)

(72) Inventor: Sang-Pill Kim, Incheon (KR)

(73) Assignee: TOSYS CO., LTD., Incheon (KR)

( * ) Notice: Subject to any disclaimer, the term of this patent is extended or adjusted under 35 U.S.C. 154(b) by 109 days.

(21) Appl. No.: 14/351,589

(22) PCT Filed: Dec. 28, 2012

(86) PCT No.: PCT/KR2012/011656
§ 371 (c)(1),
(2) Date: Apr. 14, 2014

(87) PCT Pub. No.: WO2013/100673
PCT Pub. Date: Jul. 4, 2013

(65) Prior Publication Data
US 2014/0367412 A1    Dec. 18, 2014

(30) Foreign Application Priority Data

Dec. 30, 2011  (KR) ......................... 10-2011-0147221

(51) Int. Cl.
*B60B 27/06*  (2006.01)
*B23P 19/00*  (2006.01)
(Continued)

(52) U.S. Cl.
CPC ......... *B05C 17/0116* (2013.01); *B25B 27/0035* (2013.01); *B25B 27/064* (2013.01);
(Continued)

(58) Field of Classification Search
CPC .. B25B 27/0035; B25B 27/02; B25B 27/026; B25B 27/06; B25B 27/064; B60B 27/065; B60B 27/06; B60B 2320/50; Y10T 29/53065; Y10T 29/53422; Y10T 29/53996; Y10T 29/49908; Y10T 29/49918; Y10T 29/49929; Y10T 29/49936; B21D 39/048
USPC .......................................... 72/409.19, 370.21
See application file for complete search history.

(56) References Cited

U.S. PATENT DOCUMENTS 3,026,750 A * 3/1962 Prins ..................... F16L 13/128
                                                          29/256
6,196,045 B1 * 3/2001 Thomas ................ B25B 27/146
                                                          29/751
(Continued)

FOREIGN PATENT DOCUMENTS

JP    2001-038544 A    2/2001
KR    10-0201491 B1    6/1999
KR    10-0889668 B1    3/2009

OTHER PUBLICATIONS

International Search Report for PCT/KR2012/011656.

*Primary Examiner* — Essama Omgba
(74) *Attorney, Agent, or Firm* — The PL Law Group, PLLC

(57) ABSTRACT

A hub nut caulking apparatus docked on an axle assembly includes a position setting guider to set a caulking position of a hub nut when the hub nut caulking apparatus is docked on the axle assembly, a caulking unit pressing the caulking position of the hub nut, a driving unit driving a piston rod forward using driving air pressure to provide pressing force to the caulking unit, and a driving control unit controlling the driving unit to drive the piston rod forward only if the setting of the caulking position has been finished by the position setting guider. The convenience, safety, and efficiency of a caulking work are improved, and the configuration is simplified, so that productivity is greatly improved.

10 Claims, 8 Drawing Sheets

(51) Int. Cl.
*B23P 21/00* (2006.01)
*B05C 17/01* (2006.01)
*B25B 27/00* (2006.01)
*B25B 27/06* (2006.01)

(52) U.S. Cl.
CPC ........... *B60B27/065* (2013.01); *B60B 2320/50* (2013.01); *Y10T 29/53065* (2015.01); *Y10T 29/53422* (2015.01); *Y10T 29/53996* (2015.01)

(56) References Cited

U.S. PATENT DOCUMENTS

| | | | | |
|---|---|---|---|---|
| 7,559,136 | B2* | 7/2009 | Shinjo | B23P 19/062 29/243.518 |
| 8,046,908 | B2* | 11/2011 | Shinjo | B23P 19/062 29/243.518 |
| 2014/0060136 | A1* | 3/2014 | Fujimoto | B21D 53/24 72/46 |

* cited by examiner

HUB NUT CAULKING APPARATUS

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2012/011656, filed Dec. 28, 2012, which claims priority to Korean Patent Application No. 10-2011-0147221, filed Dec. 30, 2011, entire contents of which are incorporated herein by reference.

BACKGROUND

1. Field of the Invention

The present invention relates to a hub nut caulking apparatus, in which a hub nut coupled with an axle shaft of a vehicle is caulked so that the hub nut is not released. In particular, the present invention relates to a hub nut caulking apparatus capable of improving the convenience, the stability, and the efficiency of a caulking work and simplifying the configuration thereof to improve the productivity thereof.

2. Background of Related Art

In general, power generated from an engine of a vehicle is translated to an axle shaft through a transmission, and the power received by the axle shaft is transmitted to a driving wheel through a hub and a wheel disk coupled with an outer end portion of the axle shaft.

In this case, the axle shaft is coupled with the hub through a hub nut. Since the hub nut must not be released in the state that the hub nut is semipermanently coupled, a caulking work of caulking the hub nut into a groove formed in an end portion of the axle shaft by pressing and deforming a portion of the hub nut after coupling the hub nut with the axle shaft is performed.

However, since the caulking work is performed manually via using a chisel and a hammer, the productivity and the working efficiency are degraded. In addition, caulking forth for the deformation of the hub nut is not uniformly provided to each axle shaft, so that the caulking work is not nearly performed according to regulations. Accordingly, during driving, the hub nut is released, and the wheel of a vehicle is separated from the axle shaft, which may result in a big automotive accident.

In addition, as a related art, a jig for hub nut caulking is disclosed in Korean Unexmined Utility Model Publication No. 1998-022480. The jig for hub nut caulking can solve the inconvenience of using a chisel and a hammer, but the caulking work is manually performed, so that caulking may not be uniformly performed, and there is a limitation in improving work efficiency.

Further, as another related art, an automatic caulking apparatus of a lock nut is disclosed in Korean Patent Publication No. 10-0889668. Since the caulking apparatus is automatically driven, uniform caulking is possible. However, the structure and the operating manner of the caulking apparatus are very complex, so that the manufacturing cost, and the operation and maintenance cost are significantly increased. Accordingly, there is a limitation in improving productivity.

SUMMARY

In one embodiment, provided is a hub nut caulking apparatus, capable of simply setting a caulking position and performing a caulking work with uniform force, thereby ensuring the safety, work efficiency, and convenience of the caulking work, and capable of simplifying the structure and operation, thereby saving manufacturing costs and maintenance costs, so that productivity and economical effects are greatly improved.

In another embodiment, provided is a hub nut caulking apparatus docked on an axle assembly having a structure, in which a hub nut to assemble a hub is coupled with an axle shaft having a pair of first and second grooves formed in both end portions thereof, and caulking the hub nut. The hub nut caulking apparatus includes a position setting guider inserted into the first groove of the axle shaft to set a caulking position of the hub nut when the hub nut caulking apparatus is docked on the axle assembly, a caulking unit pressing the caulking position of the hub nut set by the position setting guider such that the hub nut is caulked into the second groove of the axle shaft, a driving unit driving a piston rod forward using driving air pressure to provide pressing force to the caulking unit, and a driving control unit controlling the driving unit to operate the piston rod forward only if setting of the caulking position has been finished by the position setting guider.

In addition, the hub nut caulking apparatus may further include a position-setting display unit displaying that the setting of the caulking position has been finished by the position setting guider. The position-setting display unit may include a first branch line branching from the control pneumatic line between the detection control unit and the input control unit, and a position setting display lamp turned on by the control air pressure supplied through the first branch line.

Further, the hub nut caulking apparatus may further include a caulking completion display unit displaying that a caulking work of the caulking unit has been finished when the piston rod has been completely moved forward. The caulking completion display unit may include a second branch line branching from the control pneumatic line between the main pneumatic line and the detection control unit, a calking completion display lamp turned on by the control air pressure supplied through the second branch line, a display limit switch pressed when the piston rod has been completely moved forward, and a display pneumatic control unit provided on the second branch line to cut off the control air pressure, and to apply the control air pressure to the caulking completion display lamp as the display limit switch is pressed.

In addition, the hub nut caulking apparatus may further include a docking ring member fitted around a hub ring part protruding from the hub when the hub nut caulking apparatus is docked on the axle assembly, and a bearing support member connected with an external support cable to rotatably support the hub nut caulking apparatus.

In this case, the driving unit may include a main pneumatic line providing the driving air pressure, a switching pneumatic valve to change a direction of the provided driving air pressure, and a pneumatic cylinder driving the piston rod forward or backward in the changed direction of the driving air pressure. The driving control unit may include a control pneumatic line branching from the main pneumatic line to provide control air pressure to the switching pneumatic valve, a detection control unit provided on the control pneumatic line to detect that the setting of the caulking position has been finished by the position setting guider to primarily apply the control air pressure, and an input control unit provided on the control pneumatic line between the detection control unit and the switching pneumatic valve to secondarily apply the control air pressure to the switching pneumatic valve according to input of an operating signal by a user.

Further, the detection control unit may include a detection rod pressed on an outer surface of the hub nut and moved backward if the position setting guider is inserted into the first groove of the axle shaft, a rod spring providing forward-resilience to the detection rod, a detection-control limit switch pressed by the detection rod that is moved backward, and a detection-control air pressure control unit provided on the control pneumatic line to cut off the control air pressure, and to primarily apply the control air pressure as the detection-control limit switch is pressed.

In addition, the input control unit may include an operating button unit receiving an operating signal from a user, an input limit switch pressed by the operating button unit, and an input pneumatic control unit provided on the control pneumatic line to cut off the control air pressure and to secondarily apply the control air pressure as the input limit switch is pressed.

Further, the caulking unit may include a pressing rod coupled with a front end portion of the piston rod in the driving unit and formed at a top surface thereof with an inclined surface inclined forward, a rotatable arm having a rear end portion mounted on the inclined surface of the pressing rod and a front end portion rotated downward when the pressing rod is moved forward, a caulking punch coupled with the front end portion of the rotatable arm in a downward direction such that a portion of the hub nut corresponding to the caulking position is pressed and caulked into the second groove as the front end portion of the rotatable arm is rotated downward, and an arm spring providing resilience to the rotatable arm such that the rotatable arm returns to an original position thereof.

In addition, a lower end portion of the arm spring may be coupled with the rotatable arm and an upper end portion of the arm spring may be supported by an adjusting bolt, such that the resilience of the arm spring can be adjusted according to rotation of the adjusting bolt.

Further, the rotatable arm is provided at a rear end portion thereof with a roller member securely provided on the inclined surface of the pressing rod and rolled when the pressing rod is moved.

As described above, according to the hub nut caulking apparatus of the present invention, the caulking position can be simply set by inserting the position setting guider into the groove. In addition, when the caulking position is set, the caulking work can be performed. Accordingly, erroneous operation can be prevented and the convenience and the efficiency of the caulking work can be improved.

In addition, the hub nut of the axle shaft can be uniformly caulked at an exact position by the set caulking force of the pneumatic cylinder, so that the quality and the safety of the caulking work can be improved.

In addition, the configuration for power transmission is simple and all components are operated by air pressure, so that the manufacturing costs and operation costs can be saved. Accordingly, the productivity and economical effects can be greatly improved.

In addition to the embodiments above, those skilled in the art will appreciate that other effects may be easily deduced from the briefly characterized components above of the present invention.

DETAILED DESCRIPTION

Figure 1:
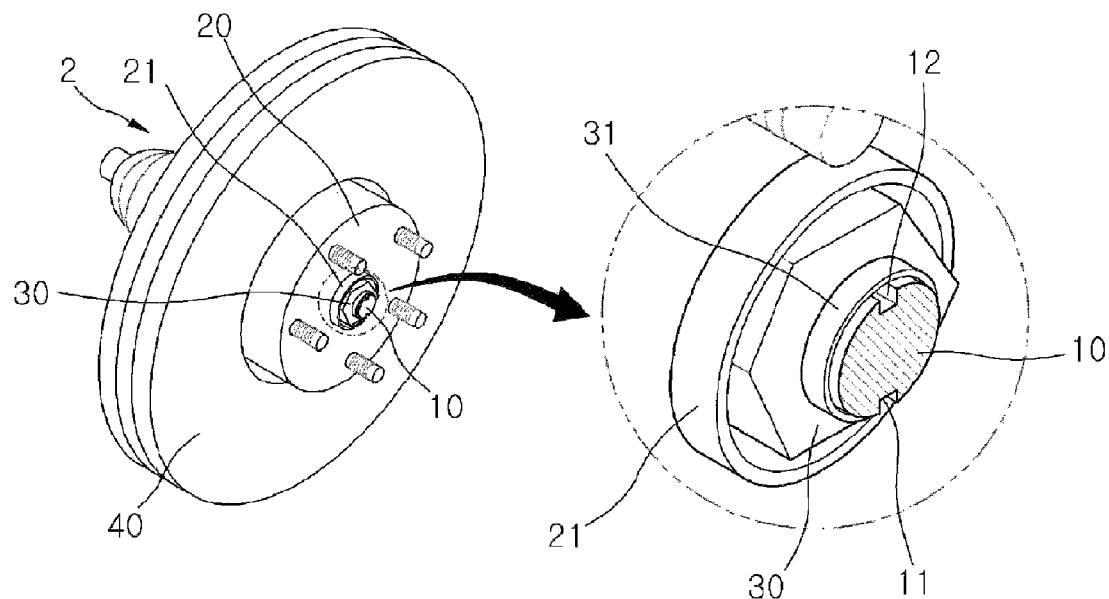
FIG. 1 is a view showing an axle assembly targeting a hub nut caulking apparatus according to one embodiment of the present invention.
Figure 2:
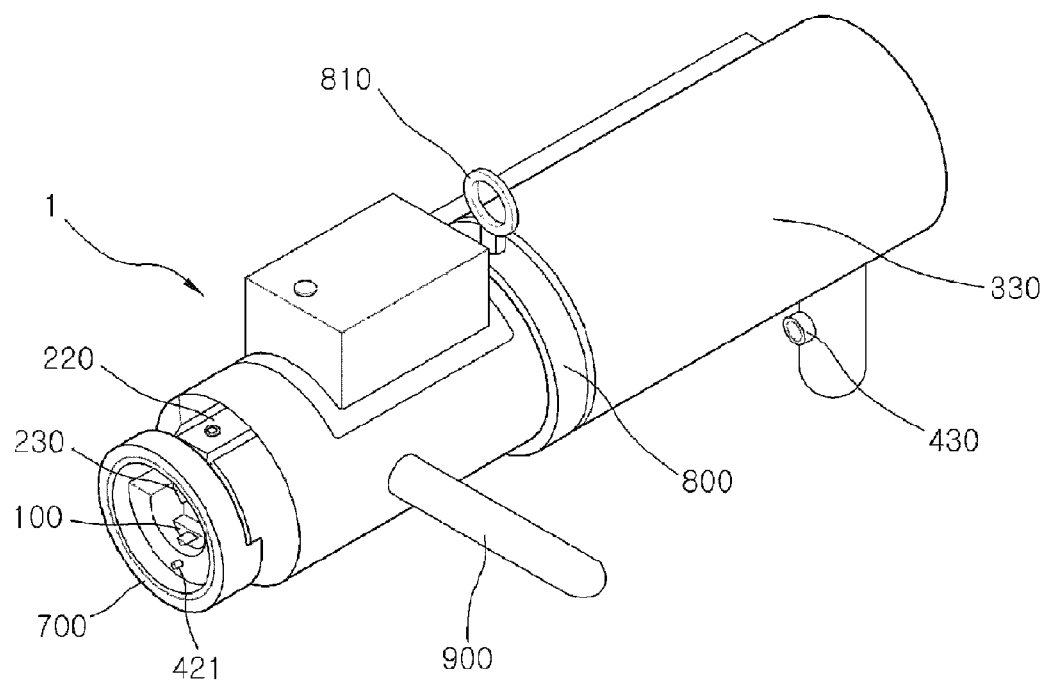
FIG. 2 is a view showing an outer appearance of the hub nut caulking apparatus according to one embodiment of the present invention.
Figure 3:
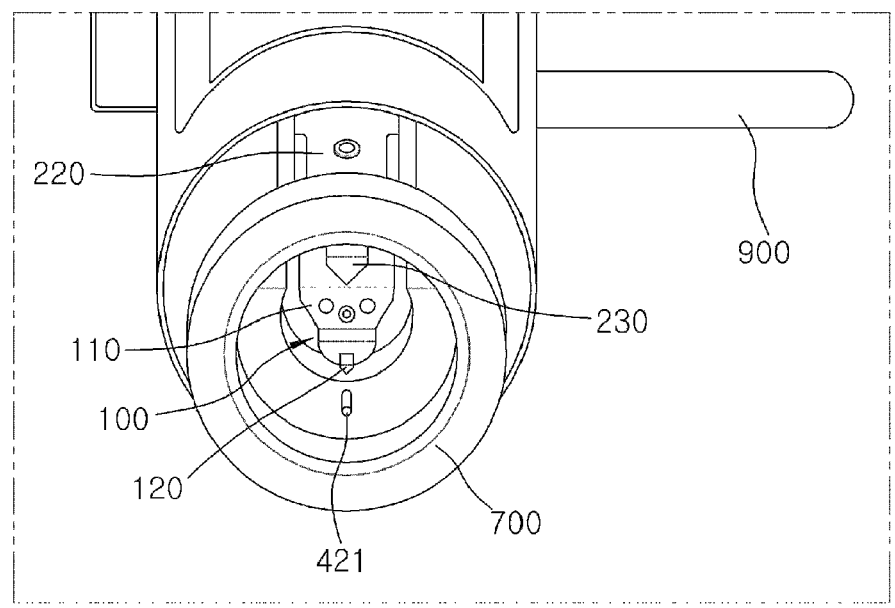
FIG. 3 is a front view of FIG. 2.

Hereinafter, a hub nut caulking apparatus according to exemplary embodiments of the present invention will be described in detail with reference to the accompanying drawings.

The embodiments of the present invention are provided to fully describe the present invention to those skilled in the art, and it is noted that the shapes and sizes of the elements may be exaggerated in the drawings to more clearly describe the elements.

In the following description, it will be understood that when a component is "coupled" or "connected" with another component, the component may be directly "coupled" or "connected" with another component, but an intervening component may also be present.

In the following description of the embodiments, items, such as known functions and known configurations, which are within the skill of those skilled in the art will not be described to improve clarity.

Prior to a description of the components of a hub nut caulking apparatus 1 according to one embodiment of the present invention, descriptions of an axle assembly 2 will be disclosed for which the hub nut caulking apparatus 1, according to the present invention, is docked for a caulking work.

FIG. 1 shows the configuration of the axle assembly 2. Referring to FIG. 1, in the state that a hub 20 is assembled with an axle shaft 10, a hub nut 30 is coupled with an end portion of the axle shaft 10 to fix the hub 20, and a wheel disk 40 is coupled outside of the hub 20.

In addition, an end portion of the axle shaft 10 is formed on both sides (i.e., lower side and upper side) thereof with a pair of first and second grooves 11 and 12, outer portions of the first and second grooves 11 and 12 of the axle shaft 10 are surrounded by a nut ring part 31 (which is caulked by the hub nut caulking apparatus 1 according to the present invention), and an outer portion of the hub nut 30 is surrounded by the hub ring part 21 protruding from the hub 20.

Hereinafter, the configuration of the hub nut caulking apparatus 1, according to one embodiment of the present invention, will be described in detail.

FIGS. 2 to 13 are views showing the hub nut caulking apparatus 1 according to one embodiment of the present invention. As shown in FIGS. 2 to 13, the hub nut caulking apparatus 1 according to one embodiment of the present invention may include a position setting guider 100, a caulking unit 200, a driving unit 300, a driving control unit, and a display unit.

Figure 4:
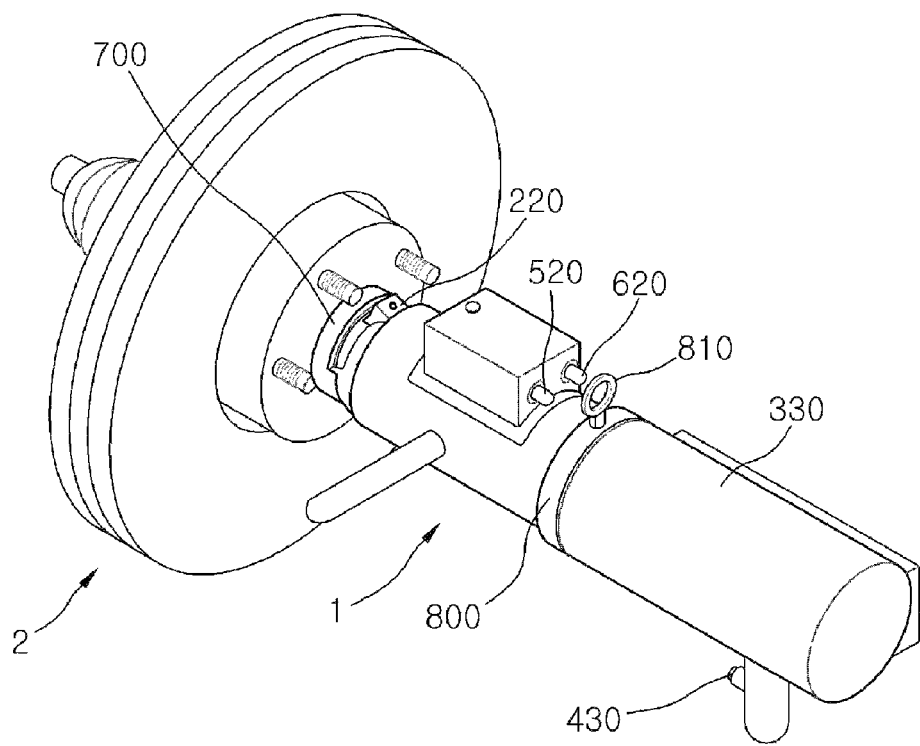
FIG. 4 is a view showing a state that the hub nut caulking apparatus is docked on the axle assembly.

Regarding the position setting guider 100 and the caulking unit 200, when the hub nut caulking apparatus 1, according to the present invention, is docked on the axle assembly 2 for the caulking work as shown in FIG. 4, the position setting guider 100 is inserted into the first groove 11 of the axle shaft 10 to set the caulking position of the hub nut 30 (that is, a portion of the hub nut 30 outside of the second groove 12), and the caulking unit 200 presses the caulking position of the hub nut 30 set by the position setting guider 100 if pressing force is provided from the driving unit 300 (supra), so that the hub nut 30 is caulked into the second groove 12 of the axle shaft 10.

Figure 5:
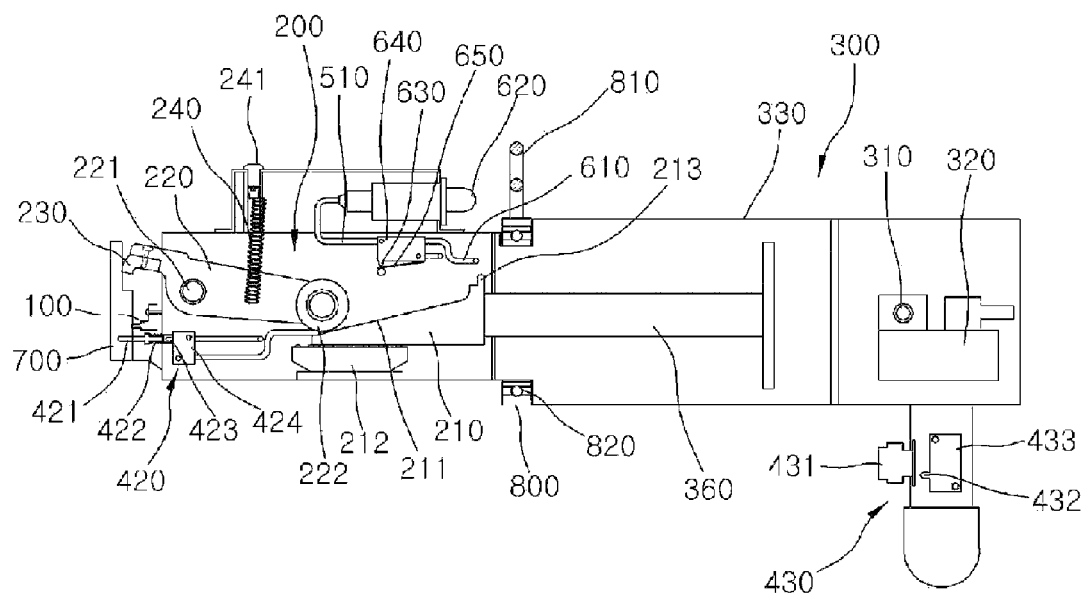
FIGS. 5 and 6 are sectional views showing the hub nut caulking apparatus before and after an operation.
Figure 6:
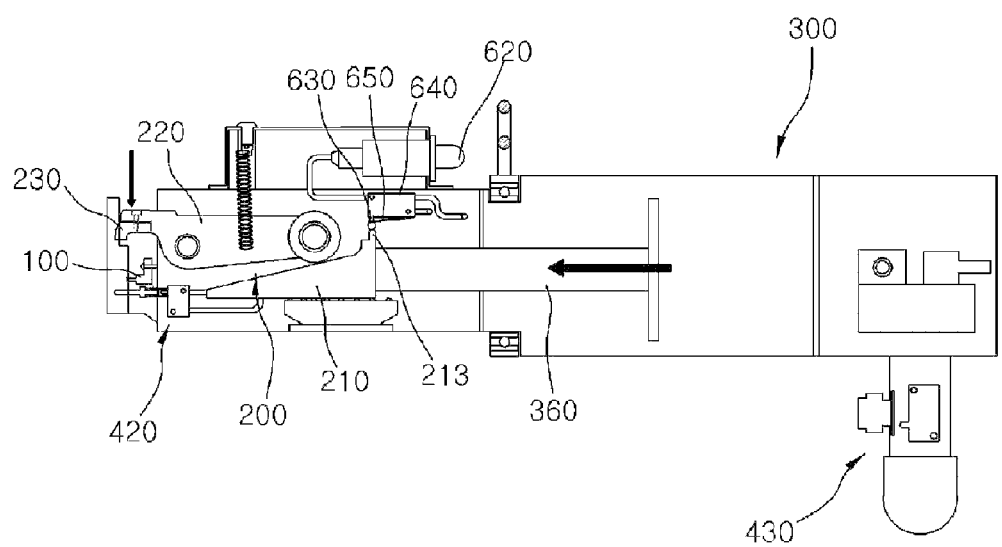
Figure 7:
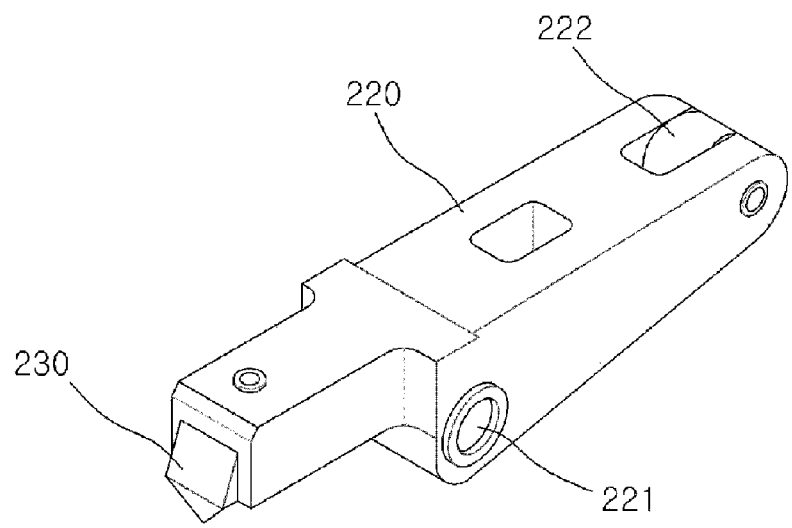
FIG. 7 is a view showing the configuration of a rotatable arm.

To this end, as shown in FIGS. 5 and 6, the caulking unit 200 may include a pressing rod 210, a rotatable arm 220, a caulking punch 230, and an arm spring 240.

The pressing rod 210 has a rear end portion coupled with a front end portion of a piston rod 360 of the driving unit 300. Accordingly, if the piston rod 360 is operated forward, the pressing rod 210 cooperates with the piston rod 360, so that the pressing rod 210 is moved forward.

The pressing rod 210 may be formed at the top surface thereof with an inclined surface 211 inclined forward, and may be provided at a lower portion thereof with a roller support 212 in which a plurality of rollers are arranged in parallel, thereby smoothly supporting the pressing rod 210 while reducing friction loss when moving the pressing rod 210.

The rotatable arm 220 is supported on a rotatable shaft 221 and a rear end portion of the rotatable arm 220 is mounted on the inclined surface 221.

If the pressing rod 210 is moved forward, the rear end portion of the rotatable arm 220 receives upward rotational force by the inclined surface 211 which is moving forward. Accordingly, rotational force is generated about the rotatable shaft 221, so that a front end portion of the rotatable arm 220 is rotated downward.

In this case, the rotatable shaft 221 of the rotatable arm 220 is preferably located eccentrically to the front end portion so that the down rotational force applied to the front end portion of the rotatable arm 220 is increased more than the upward rotational force applied to the rear end portion of the rotatable arm 220.

In addition, the rotatable arm 220 may be mounted on the rear end portion thereof with a roller member 222 securely provided on the inclined surface 211 of the pressing rod 210 and rolled on the inclined surface 211 when the pressing rod 210 is moved, so that friction can be reduced.

The caulking punch 230 is coupled with the front end portion of the rotatable arm 220 in a downward direction, so that the caulking position of the hub nut 30 is pressed by downward rotational force of the front end portion of the rotatable arm 220. Accordingly, the caulking position of the hub nut 30 is caulked into a second groove 12 of the axle shaft 10.

The caulking punch 230 actually presses the hub nut 30 to caulk the hub nut 30. Accordingly, when the caulking punch 230 is used for a long time, the caulking punch 230 may be abraded or deformed. Therefore, the caulking punch 230 is coupled with the rotatable arm 220 by using a bolt so that the caulking punch 230 can be easily replaced with new one.

An arm spring 240 provides resilience to the rotatable arm 220 so that the rotatable arm 220 can easily return to the original position thereof when forward pressing force is released by the pressing rod 210.

The arm spring 240 may be mounted in such a manner that a lower end portion of the arm spring 240 is coupled with the rotatable arm 220 and an upper end portion of the arm spring 240 is supported by an adjusting bolt 241. Therefore, the initial elasticity of the arm spring 240 is adjusted by rotating the adjusting bolt 241, so that the resilience of the arm spring 240 can be properly adjusted.

The caulking unit 200 having the above structure caulks the hub nut 30 (more specifically, the nut spring part 31 of the hub nut 30) into the second groove 12 of the axle shaft 10 by pressing the caulking punch 230. Accordingly, the caulking punch 230 is located at the caulking position (i.e., the part of the hub nut 30 outside of the second groove 12), and the caulking position is fixed without positional changes in the caulking operation.

The position setting guider 100 sets the caulking position of the hub nut 30 for the caulking punch 230. The position setting guider 100 is provided under the caulking punch 230. The position setting guider 100 includes a guider body 110 and a protrusion part 120 protruding forward from the guider body 110 by a predetermined length and having sufficient size and shape for the insertion into the first groove 11 of the axle shaft 10.

The protrusion part 120 of the position setting guider 100, and the caulking punch 230 of the caulking unit 200, form a positional relationship therebetween in such a manner that the caulking punch 230 is located at the caulking position outside of the second groove 12 if the protrusion part 120 is inserted into the first groove 11 of the axle shaft 10. Therefore, the protrusion part 120 of the position setting guider 100 is located at the side of the first groove 11 to guide the caulking punch 230 to the caulking position outside of the second groove 12. The protrusion part 120 is inserted into the first groove 11 to set the caulking position so that the caulking punch 230 is not moved at the caulking position and the caulking position is fixed.

Figure 8:
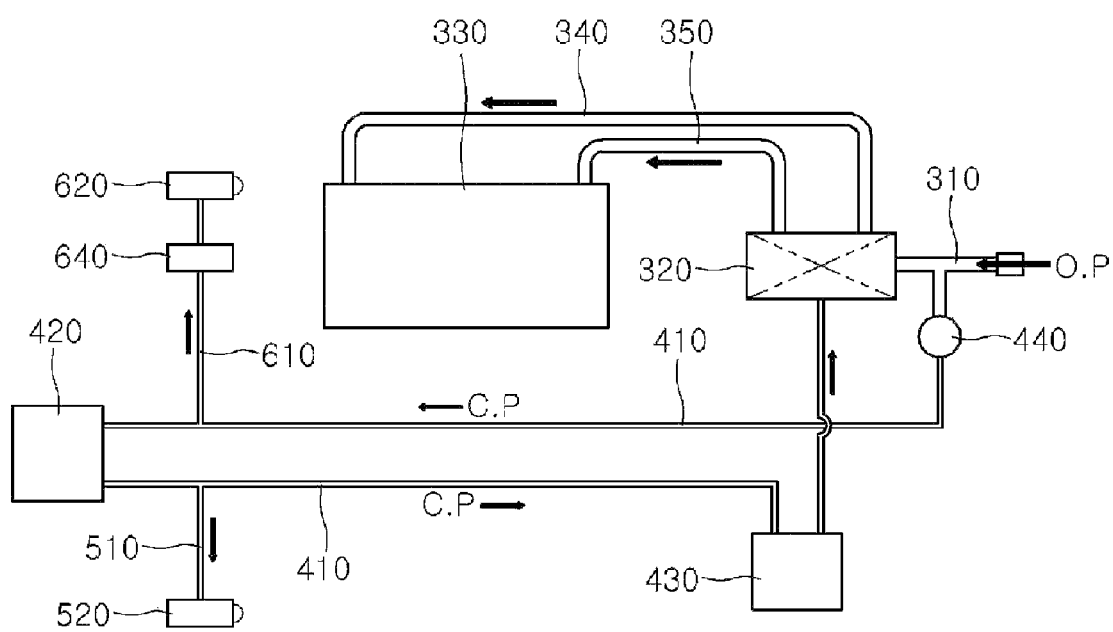
FIG. 8 is a view showing the whole block structure of a pneumatic circuit line according to one embodiment of the present invention.

Hereinafter, the driving unit 300 and the driving control unit will be described with reference to FIGS. 8 to 10. The driving unit 300 provides pressing force to the caulking unit 200 so that the caulking unit 200 may perform the caulking operation. The driving control unit controls the driving unit 300 so that the driving unit 300 provides the pressing force to the caulking unit 200 when setting of the caulking position has been finished by the position setting guider 100.

To this end, the driving unit 300 may include a main pneumatic line 310, a switching pneumatic valve 320, and a pneumatic cylinder 330.

The main pneumatic line 310 provides driving air pressure, which is used to operate the pneumatic cylinder 33, to the switching pneumatic valve 320. The switching pneumatic valve 320 switches the direction of the driving air pressure to selectively provide the driving air pressure to a front pneumatic pipe 340 and a rear pneumatic pipe 350 of the pneumatic cylinder 330. According to the direction of the driving air pressure, the pneumatic cylinder 330 operates the piston rod 360 backward or forward. In other words, if the driving air pressure is provided to the front pneumatic pipe 340, the pneumatic cylinder 330 operates the piston rod 360 backward. If the driving air pressure is provided to the rear pneumatic pipe 340, the pneumatic cylinder 330 operates the piston rod 360 forward.

The main pneumatic line 310 may be connected with an external pneumatic generating unit (not shown), such as a compressor, through a pneumatic supply line (not shown) to receive driving air pressure. In this case, the driving air pressure (O.P) may be defined as air pressure to operate the pneumatic cylinder 330. According to the present embodiment, the air pressure that is used is 6 bar.

The switching pneumatic valve is a solenoid valve to perform a switching operation by air pressure. If control air pressure (supra) is supplied, the switching pneumatic valve supplies the driving air pressure to the pneumatic cylinder 330 through the rear pneumatic line 350, so that the piston rod 360 is operated forward to supply the pressing pressure to the caulking unit 200, thereby performing the switching operation.

The driving unit 300 operates the piston rod 360 forward only if the control air pressure is supplied to the switching pneumatic valve 320, so that the pressing force is provided to the caulking unit 200. Accordingly, the driving control unit performs the driving control for the provision of the pressing force.

To this end, the driving control unit may include a control pneumatic line 410, a detection control unit 420, and an input control unit 430.

The control pneumatic line 410 is a pneumatic line to provide control air pressure in order to allow the switching pneumatic valve 320 to perform the switching operation. The control pneumatic line 410 branches from the man pneumatic line 310 and is connected with the switching pneumatic valve 320.

In this case, control air pressure (C.P) is used to operate the switching pneumatic valve 320 or display lamps 520 and 620 of the display unit (supra). According to the present embodiment, 2 bar of air pressure is used. Accordingly, the control pneumatic line 410 may have a deprssurizer 440 to reduce the high pressure (e.g., 6 bar) of the main pneumatic line 310 to the low pressure (e.g., 2 bar).

The detection control unit 420 and the input control unit 430 are provided on the control pneumatic line 410 to primarily and secondarily control the control air pressure supplied to the switching pneumatic valve 320.

The detection control unit 420 is provided on the control pneumatic line 410 to primarily cut off the control air pressure, and to detect that the setting of the caulking position has been finished if the setting of the caulking position has been finished by the position setting guider 100, so that the control air pressure is primarily applied according to the detection signal.

Figure 9:
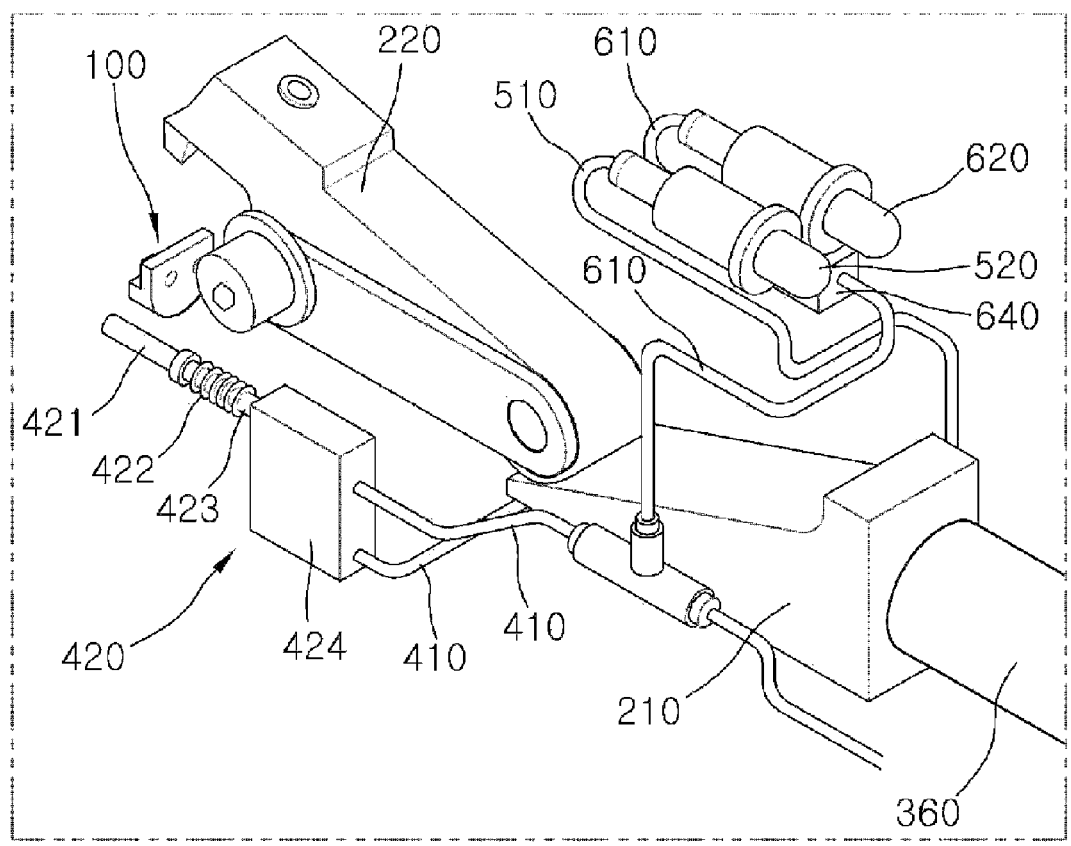
FIGS. 9 and 10 are views showing the internal structures of front and rear end portions of the hub nut caulking apparatus.
Figure 10:
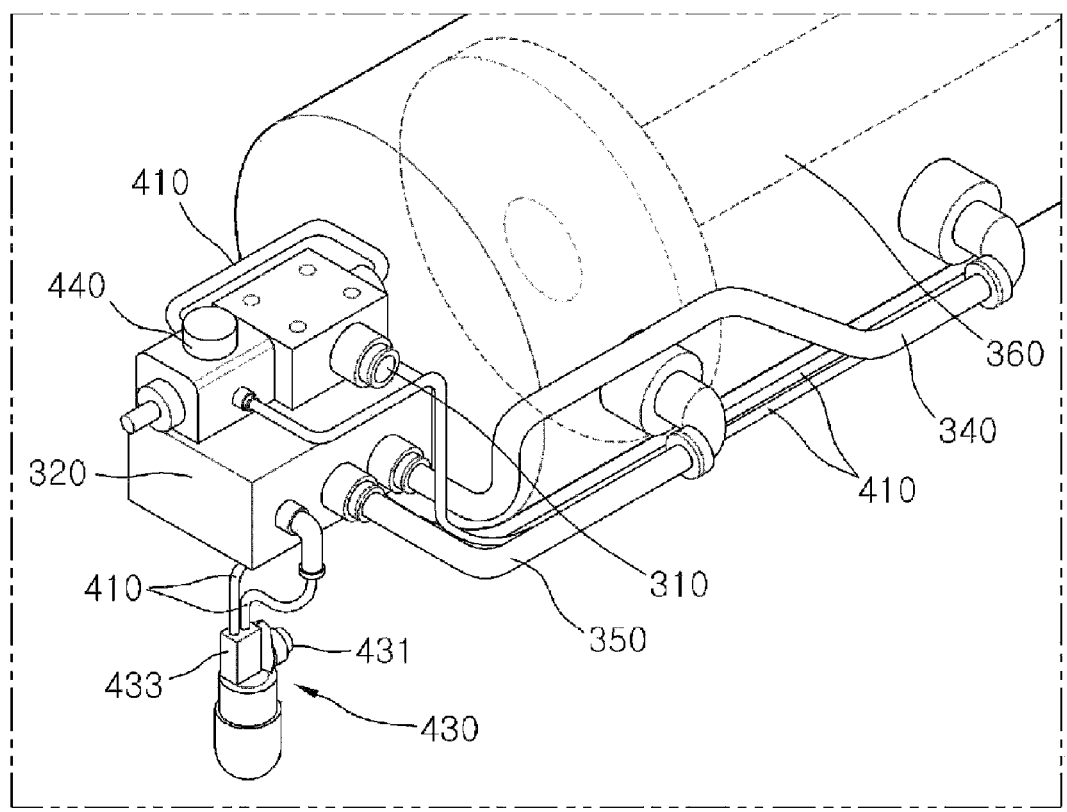

Referring to FIGS. 5 and 9, the detection control unit 420 may include a front detection rod 421 located under the position setting guider 100, a rod spring 422 to provide forward-resilience to the front detection rod 421, a detection-control limit switch 423 pressed when the front detection rod 421 is moved backward, and a detection-control air pressure control unit 424 provided on the control pneumatic line 410 to control the control air pressure.

As the protrusion part 120 of the position setting guider 100 is inserted into the first groove 11 of the axle shaft 10, the front end portion of the front detection rod 421 makes contact with an outer surface of the hub nut 30 and is pressed, so that the rod spring 422 is compressed and moved backward.

As the detection-control limit switch 423 is pressed by the front detection rod 421 that is moved backward, the detection-control air pressure control unit 424, which cuts-off the control air pressure, is open to primarily apply the control air pressure.

If the control air pressure of the pneumatic control line 410 is cut-off, and the position setting guider 100 is inserted into the first groove 11 of the axle shaft 10, that is, if the setting of the caulking position has been finished, the detection control unit 420 detects the setting of the caulking position so that the control air pressure is applied.

The input control unit 430 is provided at the side of the rear end portion of the detection control unit 420. In other words, the input control unit 430 is provided on the control pneumatic line 410 between the detection control unit 420 and the switching pneumatic valve 320. The input control unit 430 secondarily cuts off the control air pressure, and secondarily cuts off the control air pressure if the operating signal of the user is input.

The input control unit 430 may include an operating button unit 431 to receive an operating signal from a user, an input limit switch 432 pressed as the operating signal of the operating button unit 431 is input, and an input pneumatic control unit 433 provided on the control pneumatic line 410 to cut off the control air pressure and open as the input limit switch 432 is pressed to secondarily apply the control air pressure.

As recognized through the pneumatic circuit line of FIG. 8, the driving control unit controls the driving unit 300 as follows. Even if a user inputs an operating signal to the input control unit 430 in the case that the detection control unit 420 does not primarily apply the control air pressure, control air pressure is not supplied to the switching pneumatic valve 320, so that pressing force is not supplied to the caulking unit 200. After the control air pressure is primarily applied by the detection control unit 420, that is, if the setting of the caulking position has been finished by the position setting guider 100, then control air pressure is secondarily applied through the input control unit 430, thereby supplying the pressing force to the caulking unit 200.

Next, the display unit displays the operating state of the hub nut caulking apparatus 1 so that a user recognizes the operating state of the hub nut caulking apparatus 1. The display unit may include a position-setting display unit to display that the setting of the caulking position has been finished for the recognition of the user, and a caulking completion display unit to display that the caulking work has been finished for the recognition of the user.

The position-setting display unit may include a first branch line 510 branching from the control pneumatic line 410 between the detection control unit 420 and the input control unit 430 and a position setting display lamp 520 turned on by the control air pressure supplied through the first branch line 510.

Since the first branch line 510 branches from the control pneumatic line 410 at the rear end portion of the detection control unit 420, if the control air pressure is applied from the detection control unit 420, that is, if the setting of the caulking position has been finished, the control air pressure is supplied to the first branch line 510, so that the position setting display lamp 520 may be turned on. Accordingly, the user can recognize that the setting of the caulking position has been finished by recognizing that the position setting display lamp 520 is turned on.

The caulking completion display unit may include a second branch line 610 branching from the control pneumatic line 410 between the main pneumatic line 310 and the detection control unit 420, a calking completion display lamp 620 turned on by the control air pressure supplied through the second branch line 610, a display limit switch 630 pressed when the forward-movement of the piston rod 360 has been finished, and a display pneumatic control unit 640 provided on the second branch line 610 to cut-off the control air pressure, and open as the display limit switch 630 is pressed to apply the control air pressure to the caulking completion display lamp 620.

Since the second branch line 610 branches from the control pneumatic line 410 at the front end of the detection control unit 420, the control air pressure is constantly supplied regardless of the detection control unit 420. Accordingly, the control air pressure is cut-off by the display pneumatic control unit 640.

The piston rod 360 is moved forward, so that the caulking work of the caulking unit 200 is performed. Accordingly, as shown in FIG. 6, the display limit switch 630 is pressed at the time point at which the piston rod 360 is operated forward. To this end, a protrusion end 213 protrudes upward from an upper portion of the rear end portion of the pressing rod 210, and an elastic push member 650 may be provided under the display pneumatic control unit 640 and pressed upward by the protrusion end 213 at the time point at which the piston rod 360 has been completely operated forward while the display limit switch 630 is pressed.

Since the display limit switch 630 is pressed at the time point at which the piston rod 360 has been completely operated forward, the display pneumatic control unit 640 applies the control air pressure, so that the caulking completion display lamp 620 may be turned on. Accordingly, a user can recognize the completion of the caulking work by recognizing that the caulking completion display lamp 620 is turned on.

The position setting display lamp 520 and the caulking completion display lamp 620 are pneumatic lamps that are turned on by air pressure. The position setting display lamp 520 and the caulking completion display lamp 620 may include display lamps representing different colors, without limitation, so that a user can easily recognize the position setting display lamp 520 and the caulking completion display lamp 620. For example, the position setting display lamp 520 may include a red display lamp, without limitation, and the caulking completion display lamp 620 may include a green display lamp, without limitation.

According to one embodiment of the present invention, in order to more easily dock the hub nut caulking apparatus 1 according to the present invention to the axle assembly 2, a docking ring member 700 and a bearing support member 800 may be additionally provided.

The docking ring member 700 is provided at the forefront of the hub nut caulking apparatus 1 and fitted around the hub ring part 21 protruding from the hub 20 when the hub nut caulking apparatus 1 is docked on the axle assembly 2, so that the docking can be smoothly performed and the position setting guider 100 is more smoothly inserted into the first groove 11.

In addition, the bearing support member 800 is coupled with an outer circumference of the hub nut caulking apparatus 1 through the bearing 820 and provided at an upper portion thereof with a connection ring 810 that may be connected with an external support cable (not shown).

The connecting ring 810 may be connected with support cables (not shown) to support various operating facilities in a vehicle manufacturing plant so that the operating facilities can be easily moved up or down, and transferred. Accordingly, the position of the hub nut caulking apparatus 1 according to the present invention can be changed to the state wherein the hub nut caulking apparatus 1 is supported by the support cable. Accordingly, the hub nut caulking apparatus 1 can be easily docked on the axle assembly 2 or separated from the axle assembly 2. In addition, the hub nut caulking apparatus 1 is rotatably supported, so that the position of the hub nut caulking apparatus 1 is fixed while the hub nut caulking apparatus 1 is moved left or right when the position setting guider 100 is inserted into the first groove 11 of the axle shaft 10.

Handle 900, which is not described in drawings, is a handle for the user convenience.

The configuration of the hub nut caulking apparatus 1, according to one embodiment of the present invention, has been described in detail. Hereinafter, the operation of the hub nut caulking apparatus 1 will be briefly described.

As shown in FIG. 1, the hub 20 is assembled with the axle shaft 10, and the hub nut caulking apparatus 1, according to the present invention, approaches the axle assembly 2 in the state that the hub nut 30 is coupled with the assembly of the hub 20 and the axle shaft 10. In this case, as described above, the hub nut caulking apparatus 1, according to the present invention, can easily approach the axle assembly 2 in the state that the hub nut caulking apparatus 1 is rotatably supported by the support cable through the bearing support member 800.

When the hub nut caulking apparatus 1 approaches the axle assembly 2, the driving air pressure provided through the main pneumatic line 310 is supplied to the front supply tube 340 of the pneumatic cylinder 330, so that the piston rod 360 is moved backward. In addition, the control air pressure of the control pneumatic line 410 is cut-off by the detection control unit 420 so that the control air pressure is supplied only to the front end of the detection control unit 420. In this state, even if a user inputs the operating signal to the input control unit 430, the pressing force is not supplied to the caulking unit 200. In other words, the hub nut caulking apparatus 1 according to the present invention does not perform the caulking operation.

Thereafter, the hub nut caulking apparatus 1 closes in on the axle assembly 2 to start the docking operation with the axle assembly 2. In this case, the docking ring member 700 is fitted around the hub ring part 21 of the hub 20, so that the docking position of the hub nut caulking apparatus 1 is fixed. In this state, the hub nut caulking apparatus 1 is slightly moved left or right while the protrusion part 120 of the position setting guider 100 is inserted into the first groove 11 of the axle shaft 10.

Figure 11:
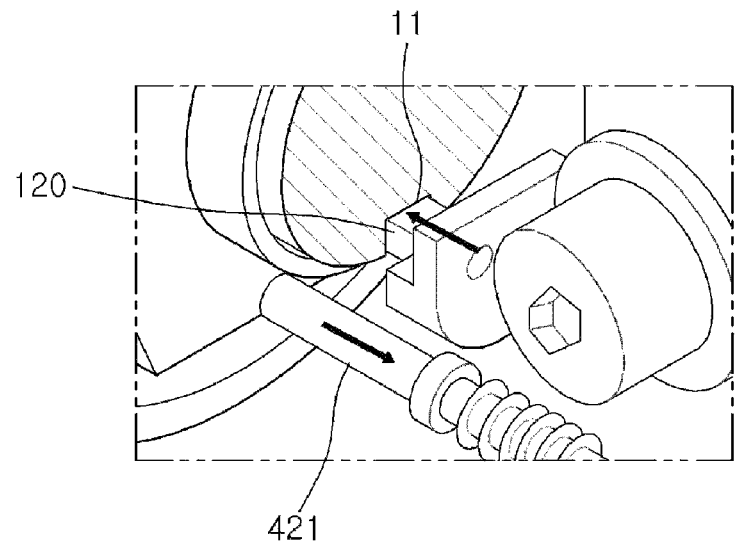
FIG. 11 is a view showing the insertion operation of the position setting guider when the hub nut caulking apparatus is docked.
Figure 12:
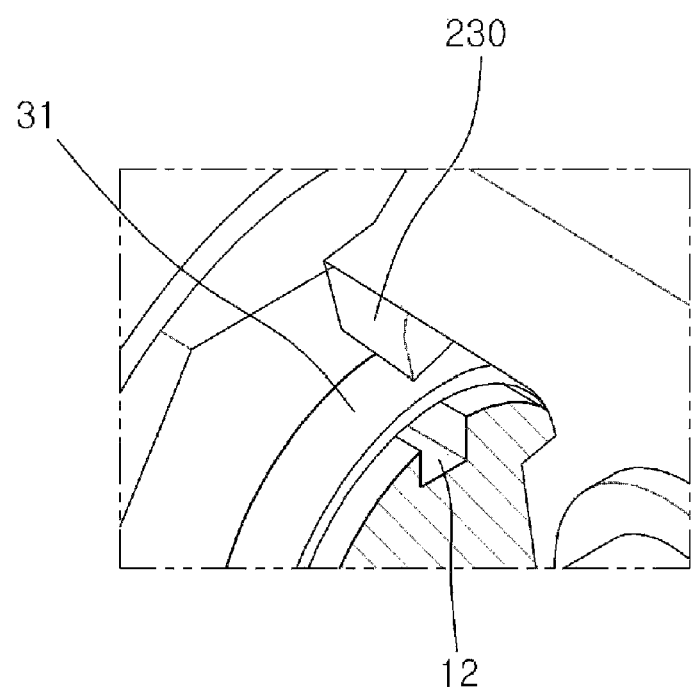
FIG. 12 is a view showing the state that the caulking punching is located at the caulking position.
Figure 13:
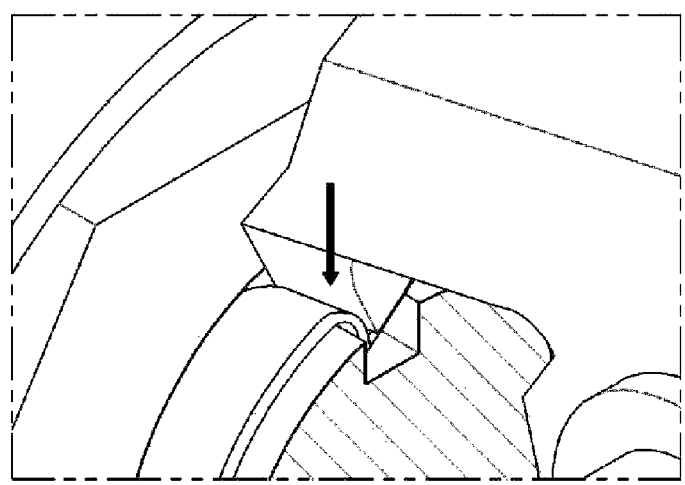
FIG. 13 is a view showing the state that the caulking punch caulks the hub nut.

As shown in FIG. 11, if the position setting guider 100 is inserted into the first groove 11, the docking of the hub nut caulking apparatus 1 has been finished, as shown in FIG. 4, while the docking ring member 700 makes complete contact with the outer surface of the hub 20. In addition, as shown in FIG. 12, the caulking punch 230 of the caulking unit 200 is positioned at the caulking position outside of the second groove 12, and the position becomes fixed, so that the setting of the caulking position has been completed. Simultaneously, as shown in FIG. 11, the front detection rod 421 is pressed on the outer surface of the hub nut 30 so that the control air pressure, which is cut-off by the detection control unit 420, is primarily applied.

If the control air pressure is primarily applied as described above, the applied control air pressure is supplied to the front end of the input control unit 430 through the control pneumatic line 410 and supplied to the position setting display lamp 520 through the first branch line 510. Accordingly, the turning-on operation of the position setting display lamp 520 is operated.

Then, a user recognizes that the setting of the caulking position has been finished through the position setting display lamp 520 and inputs an operating signal to the input control unit 430. The control air pressure is secondarily applied according to the input of the operating signal and supplied to the switching pneumatic valve 320.

If the control air pressure is supplied to the switching pneumatic valve 320, the switching pneumatic valve 320 performs a switching operation to change the direction of the driving air pressure, so that the driving air pressure is supplied to the rear supply pipe 350 of the pneumatic cylinder 330. Accordingly, the piston rod 360 is moved forward to provide pressing force to the caulking unit 200.

If the piston rod 360 is moved forward, the pressing rod 210 of the caulking unit 200 is moved forward as shown in FIG. 6, so that the front end portion of the rotatable arm 220 is rotated downward. Accordingly, the caulking punch 230, located at the caulking point outside of the second groove 12, presses the nut ring part 31 of the hub nut 30, so that the hub nut 30 is caulked into the second groove 12.

In addition, if the piston rod 360 has been completely moved forward, then the caulking work of the caulking punch 230 has been finished. In this case, as the display limit switch is pressed, the control air pressure, which is supplied to the second branch line 610, is applied and supplied to the caulking completion display lamp 620 by the display pneumatic control unit 640. Accordingly, the caulking completion display lamp 620 is turned on.

Then, the user recognizes that the caulking work has been finished through the caulking completion display lamp 620 and then releases the operating signal input to the input control unit 430. The control air pressure applied according to the input of the operating signal is again cut-off. Therefore, the switching pneumatic valve 320 is again switched to move the piston rod 360 backward, thereby releasing the pressing force applied to the caulking unit 200, and the caulking punch 230 returns to the original position thereof by the resilience of the arm spring 240.

Thereafter, if the hub nut caulking apparatus 1, which has been docked, is separated from the axle assembly 2, then the front detection rod 421 returns to the original place thereof, and the control air pressure applied by the detection control unit 420 is again cut-off, so that the hub nut caulking apparatus 1 returns to the initial state before the hub nut caulking apparatus 1 is docked.

Although an exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A hub nut caulking apparatus docked on an axle assembly having a structure in which a hub nut to assemble a hub is coupled with an axle shaft having a pair of first and second grooves formed on both end portions thereof, to caulk the hub nut, the hub nut caulking apparatus comprising:
   a position setting guider inserted into the first groove of the axle shaft to set a caulking position of the hub nut when the hub nut caulking apparatus is docked on the axle assembly;
   a caulking unit pressing the caulking position of the hub nut set by the position setting guider such that the hub nut is caulked into the second groove of the axle shaft;
   a driving unit driving a piston rod forward using driving air pressure to provide pressing force to the caulking unit; and
   a driving control unit controlling the driving unit to operate the piston rod forward only if the setting of the caulking position has been fixed by the position setting guider.

2. The hub nut caulking apparatus of claim 1, wherein the driving unit comprises a main pneumatic line providing the driving air pressure, a switching pneumatic valve to change a direction of the driving air pressure, and a pneumatic cylinder driving the piston rod forward or backward according to the changed direction of the driving air pressure,
   wherein the driving control unit comprises a control pneumatic line branching from the main pneumatic line to provide control air pressure to the switching pneumatic valve, a detection control unit provided on the control pneumatic line to detect that the setting of the caulking position has been fixed by the position setting guider to primarily apply the control air pressure, and an input control unit provided on the control pneumatic line between the detection control unit and the switching pneumatic valve to secondarily apply the control air pressure to the switching pneumatic valve according to input of an operating signal by a user, and
   wherein the switching pneumatic valve changes the direction of the driving air pressure by the provided control air pressure such that the piston rod is moved forward.

3. The hub nut caulking apparatus of claim 2, wherein the detection control unit comprises a detection rod pressed on an outer surface of the hub nut and moved backward if the position setting guider is inserted into the first groove of the axle shaft, a rod spring providing forward-resilience to the detection rod, a detection-control limit switch pressed by the detection rod that is moved backward, and a detection-control air pressure control unit provided on the control pneumatic line to cut off the control air pressure, and to primarily apply the control air pressure as the detection-control limit switch is pressed.

4. The hub nut caulking apparatus of claim 2, wherein the input control unit comprises an operating button unit receiving an operating signal from a user, an input limit switch pressed by the operating button unit, and an input pneumatic control unit provided on the control pneumatic line to cut off the control air pressure and to secondarily apply the control air pressure as the input limit switch is pressed.

5. The hub nut caulking apparatus of claim 2, further comprising a position-setting display unit displaying that the setting of the caulking position has been fixed by the position setting guider,
   wherein the position-setting display unit comprises a first branch line branching from the control pneumatic line between the detection control unit and the input control unit and a position setting display lamp turned on by the control air pressure supplied through the first branch line.

6. The hub nut caulking apparatus of claim 2, further comprising a caulking completion display unit displaying that a caulking work of the caulking unit has been fixed when the piston rod has been completely moved forward,
   wherein the caulking completion display unit comprises a second branch line branching from the control pneumatic line between the main pneumatic line and the detection control unit, a caulking completion display lamp turned on by the control air pressure supplied through the second branch line, a display limit switch pressed when the piston rod has been completely moved forward, and a display pneumatic control unit provided on the second branch line to cut off the control air pressure, and to apply the control air pressure to the caulking completion display lamp as the display limit switch is pressed.

7. The hub nut caulking apparatus of claim 1, wherein the caulking unit comprises a pressing rod coupled with a front end portion of the piston rod in the driving unit and formed at a top surface thereof with an inclined surface inclined forward, a rotatable arm having a rear end portion mounted on the inclined surface of the pressing rod and a front end portion rotated downward when the pressing rod is moved forward, a caulking punch coupled with the front end portion of the rotatable arm in a downward direction such that the caulking position of the hub nut is pressed and caulked into the second groove as the front end portion of the rotatable arm is rotated downward, and an arm spring providing resilience to the rotatable arm such that the rotatable arm returns to an original position thereof.

8. The hub nut caulking apparatus of claim 7, wherein a lower end portion of the arm spring is coupled with the rotatable arm and an upper end portion of the arm spring is supported by an adjusting bolt such that the resilience of the arm spring is adjusted according to rotation of the adjusting bolt.

9. The hub nut caulking apparatus of claim 7, wherein the rotatable arm is provided at a rear end portion thereof with a roller member securely provided on the inclined surface of the pressing rod and rolled when the pressing rod is moved.

10. The hub nut caulking apparatus of claim 1, further comprising a docking ring member fitted around a hub ring part protruding from the hub when the hub nut caulking apparatus is docked on the axle assembly, and a bearing support member connected with an external support cable to rotatably support the hub nut caulking apparatus.

* * * * *